(12) United States Patent
Ravenna et al.

(10) Patent No.: US 9,272,575 B2
(45) Date of Patent: Mar. 1, 2016

(54) WHEEL BEARING RETAINER

(71) Applicant: Diversified Machine Inc., Wixom, MI (US)

(72) Inventors: Peter Ravenna, Northville, MI (US); Cory A. Ryner, Plymouth, MI (US)

(73) Assignee: DIVERSIFIED MACHINE, INC., Wixom, MI (US)

( * ) Notice: Subject to any disclaimer, the term of this patent is extended or adjusted under 35 U.S.C. 154(b) by 0 days.

(21) Appl. No.: 14/265,532

(22) Filed: Apr. 30, 2014

(65) Prior Publication Data

US 2014/0232176 A1 Aug. 21, 2014

Related U.S. Application Data

(62) Division of application No. 12/886,068, filed on Sep. 20, 2010, now Pat. No. 8,740,467.

(60) Provisional application No. 61/244,089, filed on Sep. 21, 2009.

(51) Int. Cl.
 F16C 13/00 (2006.01)
 B60B 27/00 (2006.01)
 F16C 35/067 (2006.01)
 F16C 19/18 (2006.01)
 F16B 21/18 (2006.01)

(52) U.S. Cl.
 CPC ......... B60B 27/0078 (2013.01); B60B 27/0005 (2013.01); F16C 35/067 (2013.01); F16B 21/18 (2013.01); F16C 19/184 (2013.01); F16C 2326/02 (2013.01)

(58) Field of Classification Search
 CPC ............ B60B 27/0005; B60B 27/0078; F16C 19/184; F16C 19/38; F16C 19/386; F16C 35/067; F16C 35/077; F16C 2326/02
 See application file for complete search history.

(56) References Cited

U.S. PATENT DOCUMENTS

| 2,476,586 A | 7/1949 | Darash |
| 4,006,659 A | 2/1977 | Wurzel et al. |
| 4,343,581 A | 8/1982 | Millheiser |

(Continued)

FOREIGN PATENT DOCUMENTS

| DE | 102005032888 A1 | 1/2007 |
| EP | 0239556 A1 | 9/1987 |

(Continued)

OTHER PUBLICATIONS

International Search Report, Application No. PCT/US2010/049475, dated Dec. 1, 2010.

*Primary Examiner* — James Pilkington
(74) *Attorney, Agent, or Firm* — The Dobrusin Law Firm, P.C.

(57) ABSTRACT

The knuckle-hub assembly includes a knuckle and a wheel bearing attached by a retainer. Both the knuckle and the retainer have recesses and the retainer is arranged in both recesses upon assembly. The retainer is generally ring-shaped and has a axial direction perpendicular to the circumferential direction. Near one end surface in the axial direction and the retainer has a union portion connected to one or more flange portions. The one or more flange portions may be a single flange portion angled relative to the axial direction. The one or more flange portions may include a first flange portion and a second flange portion that are angled relative to each other.

20 Claims, 9 Drawing Sheets

(56) References Cited

U.S. PATENT DOCUMENTS

| | | | |
|---|---|---|---|
| 4,881,842 A | 11/1989 | Farrell et al. | |
| 5,564,838 A | 10/1996 | Caillault et al. | |
| 5,651,617 A | 7/1997 | Danielsson | |
| 5,785,433 A | 7/1998 | Takahashi et al. | |
| 5,915,875 A | 6/1999 | Bodtker | |
| 5,927,867 A * | 7/1999 | Niebling et al. | 384/539 |
| 5,988,341 A | 11/1999 | Allen et al. | |
| 6,406,186 B1 | 6/2002 | Torii et al. | |
| 6,705,763 B2 | 3/2004 | Kamura et al. | |
| 6,883,816 B2 | 4/2005 | Baker et al. | |
| 7,090,061 B2 | 8/2006 | Bove et al. | |
| 7,121,632 B2 | 10/2006 | Grabaum | |
| 7,131,632 B2 | 11/2006 | Kish, Jr. | |
| 7,374,345 B2 * | 5/2008 | Ilie et al. | 384/537 |
| 7,927,021 B2 * | 4/2011 | Schumacher et al. | 384/537 |
| 2003/0002762 A1 | 1/2003 | Kamura et al. | |
| 2005/0105840 A1 | 5/2005 | Muranaka et al. | |

FOREIGN PATENT DOCUMENTS

| | | |
|---|---|---|
| FR | 2631402 A1 | 11/1989 |
| JP | 61/094620 U | 6/1986 |
| JP | 2005/042894 A | 2/2005 |
| JP | 2007/321778 A | 12/2007 |
| WO | 2008/154916 A2 | 12/2008 |

* cited by examiner

WHEEL BEARING RETAINER

CLAIM OF BENEFIT OF FILING DATE

The present application claims the benefit of the filing date of U.S. Provisional Application No. 61/244,089, filed Sep. 21, 2009, the contents of which are hereby expressly incorporated by reference.

FIELD OF THE INVENTION

The invention generally relates to wheel bearing retaining.

DESCRIPTION OF THE RELATED ART

Although conventional wheel bearing retainers and knuckle-hub assemblies have been proven useful, such knuckle-hub assemblies are nevertheless susceptible to improvements that may enhance or improve their service life and/or performance. The typical knuckle material will be either cast iron (which offers higher weight and typically lower cost per mass unit) or cast/forged aluminum (which offers lower weight and typically higher cost per mass unit). The typical steel wheel bearing will be either a higher weight, higher cost flanged outer race bearing or a lower weight, and lower cost cylindrical outer race bearing. Typical knuckle-hub assemblies contain a cast iron knuckle supporting either a flanged outer race wheel bearing or a cylindrical outer race wheel bearing. The flanged outer race wheel bearing is retained using several bolts, while the cylindrical outer race wheel bearing is retained using an interference fit between the knuckle center bore and the bearing outer race. The cylindrical outer race bearing attachment often utilizes a retaining ring "snap-ring" located at either of the axial lengths of the bearing to limit movement normal operating loads. Additionally, many knuckle-hub assemblies contain an aluminum knuckle that supports a flanged outer race wheel bearing using several bolts. Although the use of aluminum knuckles supporting cylindrical outer raced wheel bearings offers reduced weight versus the cast iron knuckle and reduced cost versus the flanged outer race bearing, it is less common due to movement of the wheel bearing due to different material thermal expansions (aluminum vs. steel) under normal operating temperatures. The current technology retainer rings "snap-rings" do not provide the axial retention required for robust performance.

An additional retention method includes forming the cylindrical bearing outer race about the knuckle, but this method is likely to increase wheel bearing and assembly costs. As the goal of most knuckle-hub assembly designs is to provide the minimum weight and minimum cost, the use of cast aluminum combined with a cylindrical outer race wheel bearing offers the best combination provided the bearing retention is robust. Some examples of knuckles, snap-rings, wheel bearings, or a combination thereof may be found in U.S. Pat. Nos. 4,881,842; 6,406,186; 6,705,763; 6,883,816: 7,090,061; 7,121,632 all of which are incorporate by reference herein for all purposes. Therefore, a need exists in the art for the development of an improved cast aluminum knuckle to cylindrical outer race wheel bearing retention method.

BRIEF DESCRIPTION OF THE DRAWINGS

The disclosure will now be described, by way of example, with reference to the accompanying drawings, in which.

DETAILED DESCRIPTION OF THE INVENTION

The Figures illustrate examples of a novel wheel bearing retainer for a knuckle-hub assembly. Based on the foregoing, it is to be generally understood that the nomenclature used herein is for convenience and the terms used to describe the invention should be given the broadest meaning by one of ordinary skill in the art.

The present invention pertains generally to a knuckle-hub assembly comprising: a knuckle, wherein the knuckle includes an inner radial surface defining a passage, wherein the inner radial surface comprises a first radial recess located in an intermediate region along a longitudinal axis of the passage; a wheel bearing, wherein the wheel bearing includes an outer radial surface defining a second radial recess that is located in an intermediate region along the length of the bearing, wherein the first radial recess of the knuckle is generally axially-aligned with the second radial recess upon installation of the bearing in the passage of the knuckle; and a retainer arranged within both of the first radial recess of the knuckle and the second radial recess of the wheel bearing upon installation of the bearing in the passage of the knuckle, and the retainer has a generally constant cross-sectional profile about its circumference and includes an inner wall surface that has a first portion and a second portion and the first portion and the second portion are disposed at an angle relative to each other.

The present invention also contemplates a knuckle-hub assembly comprising: a wheel bearing retainer including: a ring-shaped member having: a first end; a second end; an outer radial surface; and an inner radial surface that includes a first portion and a second portion that is tapered forms an angle of about 25° or greater relative to the first portion; wherein the cross-section of the wheel bearing retainer is generally trapezoidal in shape and the trapezoidal cross-section includes a length and a thickness and the ratio of the length to thickness of the wheel bearing retainer is about 2:1 or more; a wheel bearing including: a circumferential outer radial surface and a circumferential radial recess located in an intermediate portion of the outer surface of the wheel bearing for receiving the wheel bearing retainer; a knuckle that includes: a recess that defines a passage to receive the wheel bearing; a circumferential inner radial surface located in an intermediate portion inside of the recess; and a circumferential radial recess in the inner radial surface for receiving the wheel bearing retainer; wherein the, wheel bearing circumferential radial recess and the knuckle circumferential radial recess are substantially juxtaposed and are substantially the same length, and the wheel bearing retainer is fit within the wheel bearing circumferential radial recess and the knuckle circumferential radial recess so that the wheel bearing is retained by the wheel bearing retainer.

Figure 1:
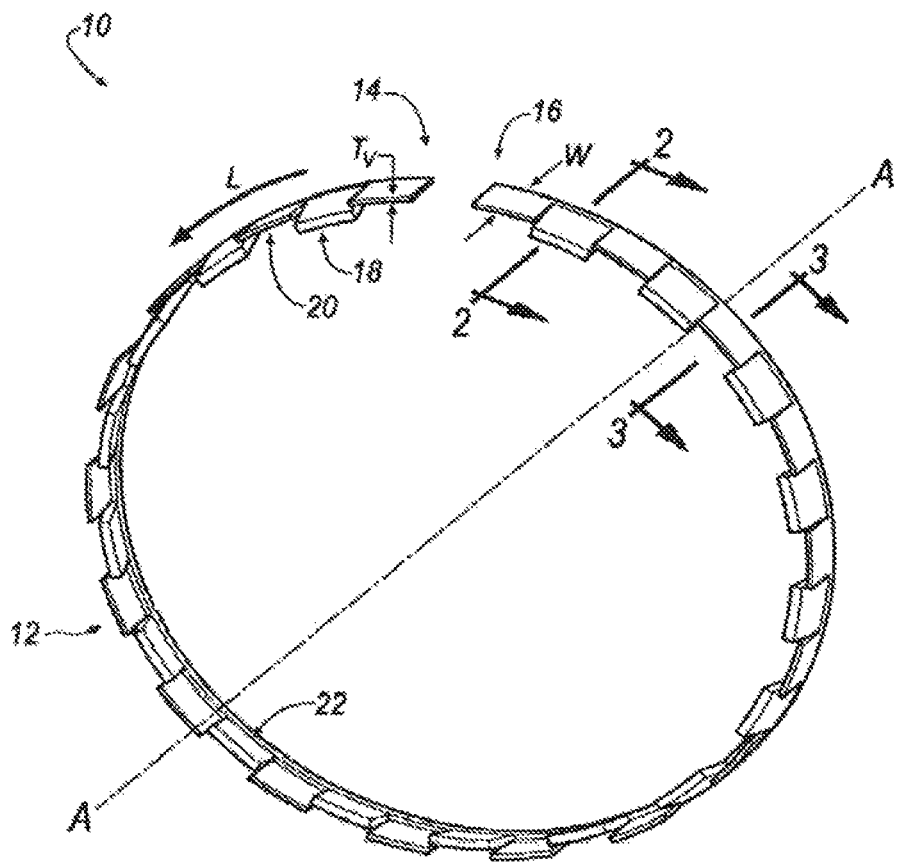
FIG. 1 illustrates an isometric view of an example of a wheel bearing retainer.

Referring to FIG. 1, a retainer 10 includes a member 12 having a length, L, and a width, W. The member 12, may include any desirable material, such as, for example, steel, heat-treated steel, a resilient material, or the like. Although steel and heat-treated steel are discussed herein, it will be appreciated that the retainer 10 is not limited to include any particular type of material and that the invention may be practiced with any desirable material. The retainer may be made of aluminum. The retainer may be entirely closed or more preferably may have an opening defining two ends. The length, L, of the member 12 includes a first end 14 and a second and 16. The first end 14 may be arranged in a substantially adjacent or substantially opposing relationship with the second end 16 such that the length, L, of the member 12 may be arranged in a substantially circular, ring-shaped orientation. The retainer may be substantially entirely circular. The retainer may be generally ring-shaped.

The member 12 may have a varying thickness, designated generally at $T_V$, that may be defined by at least one first portion 18 having a first thickness, $T_1$, (see also, e.g., FIG. 2) and at least one second portion 20 having a second thickness, $T_2$, (see also, e.g., FIG. 3) that is different from the first thickness, $T_1$. The member 12 may include a plurality of first portions 18 and a plurality of second portions 20. The member 12 may be configured to include a repeating, alternating pattern of a first portion 18 adjacent a second portion 20 for substantially the length, L, of the member 12. The number of first portions 18 and second portions 20 may be chosen based on design requirements, and alternatively, other structures/configurations may be used (e.g., see FIGS. 7 and 8 below).

Figure 2:
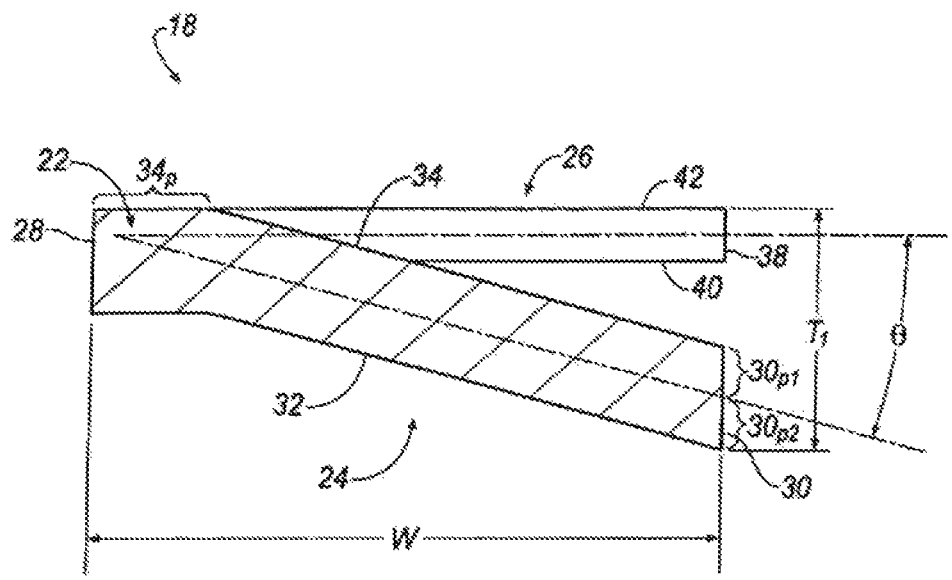
FIG. 2 illustrates a cross-sectional view of the wheel bearing retainer of FIG. 1 according to line 2-2.
Figure 3:
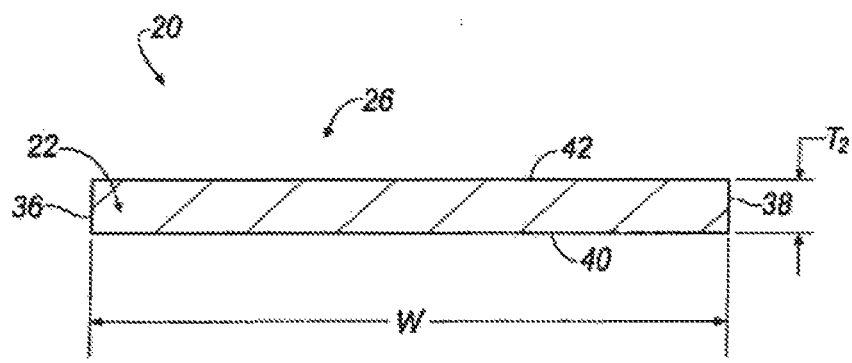
FIG. 3 illustrates a cross-sectional view of the wheel bearing retainer of FIG. 1 according to line 3-3.

Referring to FIGS. 2-3, the member 12 includes a union portion 22 that joins neighboring first and second portions 18, 20. The first portion 18 includes a first flange portion 24 extending from the union portion 22, and, in an example, the second portion 20 includes a second flange portion 26 extending from the union portion 22. Each of the first portion 18 and the second portion 20 may include the width, W as substantially the same width, or they may be configured as having different widths, or varying widths.

The first flange portion 24 includes a first thickness, $T_1$ and the second flange portion 26 includes a second thickness, $T_2$. The second thickness, $T_2$, may be configured to be less than the first thickness, $T_1$. Note that the thicknesses $T_1$ and $T_2$ may not coincide with the overall thickness of the material used for retainer 10 but rather the thickness of the overall section taken from outer radial surface 42 to the end of inner radial surface 32. Moreover, where ring 10 may be chosen to be formed from a single-thickness material, the individual thicknesses of union portion 22, and first and second portions 18, 20 may be the same, or substantially the same.

In reference to a central axis, A-A (see FIG. 1), in an example, the first portion 18 may include a first axial end surface 28, a second axial end surface 30, an inner radial surface 32 and an outer radial surface 34. The second portion 20 may include a first axial end surface 36, a second axial end surface 38, an inner radial surface 40 and an outer radial surface 42.

The first flange portion 24 projects from the union portion 32 at an angle, θ, relative the second flange portion 26, The angle, θ (see FIG. 2), may be approximately equal to about 20°. Alternatively, the angle θ may include a wide range depending on the performance characteristics desired. The angle θ, for example, may be in the range of between about 15°-35°. Alternatively, the angle θ, for example, may be in the range of between about 10°-65°. As will be explained in the foregoing disclosure, the first flange portion 24 may project at the angle, θ, when the first flange portion 24 is in a substantially relaxed state (see, e.g., FIGS. 5A, 5C), and in an example, the first flange portion 24 may be moved to project at an angle, θ=about 0°, when the first flange portion 24 is moved to a substantially non-relaxed state (see, e.g., FIG. 5B).

Figure 4:
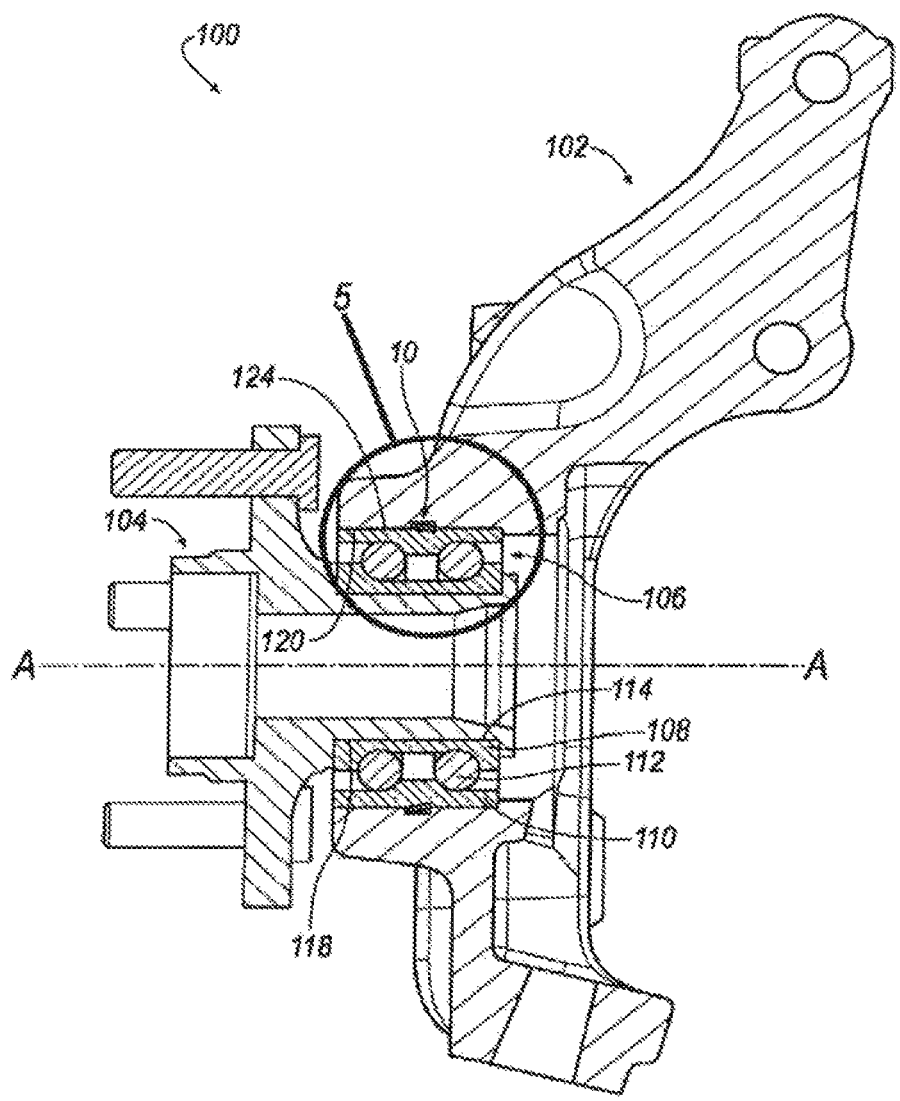
FIG. 4 illustrates a cross-sectional view of an example of a knuckle-hub assembly.

Referring to FIG. 4, a knuckle-hub assembly 100 includes a knuckle 102, a hub 104 and a wheel bearing 106. The wheel bearing 106 includes an inner race 108, an outer race 110 and balls 112 arranged between and connecting the inner race 108 to the outer race 110. The knuckle 102 may include any desirable material, such as, for example, cast aluminum, forged aluminum, forged steel, cast iron or the like. The wheel bearing 106 may include, for example, a "GEN1" wheel bearing, a "GEN2" wheel bearing, a "GEN3" wheel bearing or the A "GEN1" bearing typically consists, of a cylindrical outer race, two separate cylindrical inner races, several rolling elements, retainers, seals and lubricant. A "GEN2" wheel bearing typically consists of a flanged outer race, two separate cylindrical inner races, several rolling elements, retainers, seals and lubricant. While a "Gen3" wheel bearing typically consists of a flanged outer race, one cylindrical inner race, one flanged inner race with integral wheel hub, several rolling elements, retainers, seals, and lubricant. Although not illustrated, it will be appreciated that the knuckle-hub assembly 100 may include additional components that are not shown in FIG. 4, such as, for example, ball joints, bushings, dust/heat shields and caliper/rotor assemblies, etc.

Figure 5A:
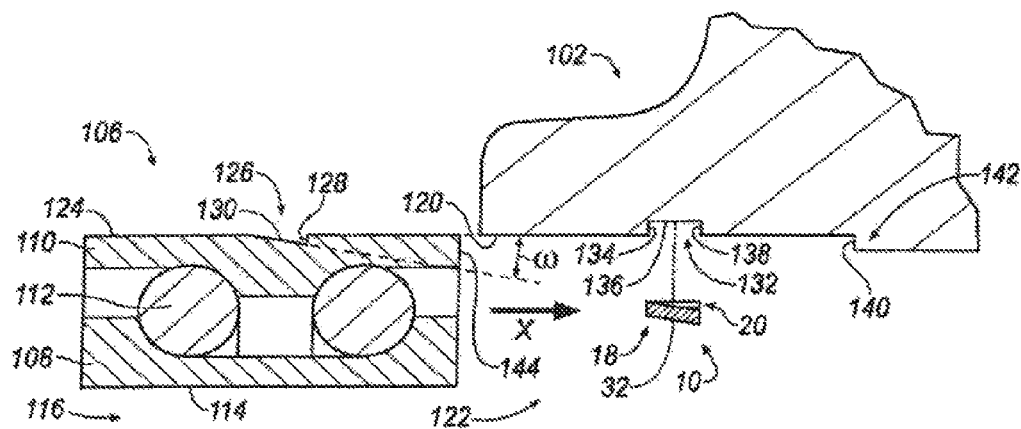
FIG. 5A illustrates a portion of an enlarged, exploded cross-sectional view of the knuckle hub assembly of FIG. 4.
Figure 5B:
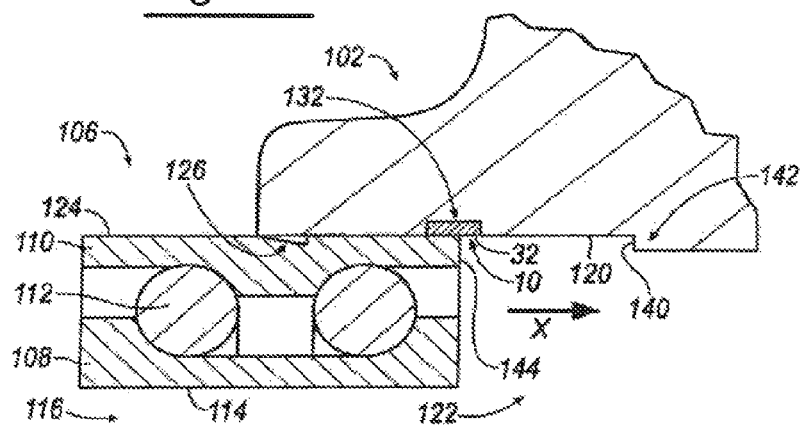
FIG. 5B illustrates a portion of an enlarged, partially-assembled cross-sectional view of the knuckle hub assembly according to FIG. 5A.
Figure 5C:
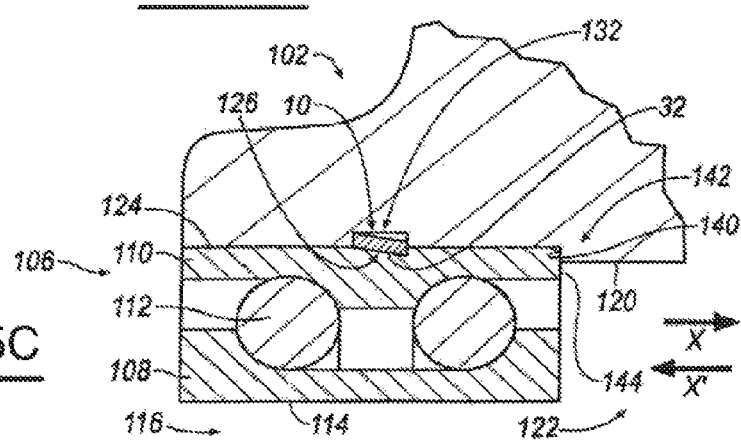
FIG. 5C illustrates an enlarged cross-sectional view of the knuckle-hub assembly of according to FIGS. 5A-5B and line 5 of FIG. 4.

An outer radial surface 114 of the inner race 108 defines a passage 116 (see, e.g., FIGS. 5A-5C). The hub 104 may be inserted through the passage 116 and an outer radial surface 118 of the hub 104 may be arranged adjacent the outer radial surface 114 of the inner race 108 to connect the hub 104 to the wheel bearing 106.

An inner radial surface 120 of the knuckle 102 generally defines a passage 122 (see, e.g., FIGS. 5A-5C). The passage may be any structure that allows a wheel bearing to be placed in a knuckle. The passage may be a through hole opening. The passage may have a closed end. The passage may have a substantially closed end (i.e., there is an opening on the closed end that is substantially smaller than the opening on the other side). The passage has a depth and two opposing ends. The passage has an intermediate portion located between the two opposing ends. One or more of the hub 104 and wheel bearing 106 may be inserted through the passage 122 of the knuckle 102. An outer radial surface 124 of the outer race 110 may be arranged adjacent the it radial surface 120 of the knuckle 102 to connect the wheel bearing 106 to the knuckle 102. The outer radial surface 124 of the outer race 110 may be press-fit or roll-formed to the inner radial surface 120 of the knuckle 102 in order to connect the wheel bearing 106 to the knuckle 102.

Referring to FIGS. 4-5C, the knuckle-hub assembly 100 may also include the retainer 10 that may functionally retain or mechanically-lock the wheel bearing 106 in an axially-fixed orientation relative the knuckle 102 with respect to the axis, A-A. As such, the retainer 10 may be referred to hereinafter as a wheel bearing retainer.

Referring to FIG. 5A, the outer radial surface 124 of the outer race 110 defines a substantially circumferential, radial recess 126 that may be located near the outer radial surface 124 of the outer race 110. In an example, radial recess 126 may be machined into surface 124. Alternatively, recess 126 need not be configured as an angled recess and may be configured as a generally rectangular slot, for example, as having a similar profile to recess 32. The alternative configurations for recess 126 may be desirable in some circumstances because surface 128 will provide for axial retainment while and the geometric configuration for the rest of recess 126 may be configured for ease of manufacturing or other design requirements. However, recess 126 may be configured as having an angled recess because such a fitting of recess 126 to retainer 10 may reduce the amount of contamination, if any, collected near retainer 10.

The substantially circumferential, radial recess 126 of the outer race 110 may include an axial surface portion 128 and a radial surface portion 130. The radial surface portion 130 may project from the outer radial surface 124 at an angle, ω, that may be approximately equal to, for example, about 20°, and terminates at the axial surface portion 128. The axial surface portion 125 may be substantially perpendicular to and project from the outer radial surface 124 of the outer race 110.

The inner radial surface 120 of the knuckle 102 define a substantially circumferential, radial recess 132. The substantially circumferential, radial recess 132 may be machined into the inner radial surface 120 of the knuckle 102. The substantially circumferential, radial recess 132 includes a first axial surface portion 134 projecting substantially perpendicularly from the inner radial surface 120, a radial surface portion 136 projecting substantially perpendicularly from the first axial surface portion 134 and a second axial surface portion 138 projecting substantially perpendicularly from the radial surface portion 136 to the inner radial surface 120.

The knuckle 102 includes a substantially circumferential, axial surface 140 that projects radially inwardly and substantially perpendicularly from the inner surface 120. Axial surface 140 may be defined by a radially-inward projecting portion 142 of the knuckle 102. Referring to FIG. 5C, when an axial end surface 144 of the outer race 110 is arranged substantially adjacent the circumferential, axial surface 140 of the radially-inward projecting portion 142 of the knuckle 102, the substantially circumferential, radial recess 126 of the outer race 110 may be substantially axially-aligned with the substantially circumferential, radial recess 132 of the knuckle 102.

Referring to FIGS. 2-3 and 5A, prior to insertion of one or more of the hub 104 and the wheel bearing 106 through the passage 122 of the knuckle 102, the wheel bearing retainer 10 may be arranged within the substantially circumferential, radial recess 132 of the knuckle 102. The first axial end surfaces 28, 36 of the first and second portions 18, 20 of the wheel bearing retainer 10 may be arranged substantially adjacent the first axial surface portion 134 of the substantially circumferential, radial recess 132 of the knuckle 102. A portion $34_P$ of the outer radial surface 34 of the first portion 18 and the outer radial surface 42 of the second portion 20 of the wheel bearing retainer 10 may be arranged substantially adjacent the radial surface portion 136 of the substantially circumferential, radial recess 132 of the knuckle 102. A first portion $30_{P1}$ of the second axial end surface 30 of the first portion 18 and the second axial end surface 38 of the second portion 20 of the wheel bearing retainer 10 may be arranged substantially adjacent the second axial surface portion 138 of the substantially circumferential, radial recess 132 of the knuckle 102.

Referring to FIG. 5B, once the wheel bearing retainer 10 is arranged within the substantially circumferential, radial recess 132 of the knuckle 102, one or more of the hub 104 and a wheel bearing 106 may be inserted through the passage 122 of the knuckle 102 according to the direction of arrow, X, such that the outer radial surface 124 of the outer race 110 may be arranged substantially adjacent the inner surface 120 of the knuckle 102. Further, as the wheel bearing 106 is being advanced through the passage 122 of the knuckle 102, the inner radial surface 32 of first portions 18 of the wheel bearing retain& 10 may also come into contact with the outer radial surface 124 of the outer race 110. Accordingly, upon the outer radial surface 124 of the outer race 110 coming into contact with the inner radial surface 32 of the first portions 18, the first portions 18 may be moved from the relaxed state (see, e.g., FIG. 5A) to the non-relaxed state (see, e.g., FIG. 5B) such that the first portions 18 may be arranged substantially within the substantially circumferential, radial recess 132 of the knuckle 102.

Referring to FIGS. 5B-5C, once one or more of the hub 104 (see FIG. 4) and wheel bearing 106 have been advanced through the passage 122 of the knuckle 102 according to the direction of the arrow, X, such that the axial end surface 144 of the outer race 110 is arranged substantially adjacent the circumferential, axial surface 140 of the radially-inward projecting portion 142 of the knuckle 102 (see, e.g., FIG. 5C), the substantially circumferential, radial recess 126 of the outer race 110 may be axially-aligned with the substantially circumferential, radial recess 132 of the knuckle 102 as described above. When arranged in the above-described orientation, the inner radial surface 32 of the first portions 18 may no longer be biased to the non-relaxed state within the substantially circumferential, radial recess 132; as such, the first portions 18 may move/snap/spring from the substantially non-relaxed state (see, e.g., FIG. 5B) to the substantially relaxed state (see, e.g., FIG. 5C) such that at least a portion of the first portions 18 may be arranged within the substantially circumferential, radial recess 124 of the outer race 110 as the remaining portion of the first portions 18 may be arranged within the substantially circumferential, radial recess 132 of the knuckle 102. Once in place, ring 10 cooperates with the features of knuckle 102 and bearing 106 to axially lock them in place.

Referring to FIGS. 2 and 5C, in an example, the first portion $30_{P1}$ of the second axial end surface 30 of the first portions 18 may be arranged substantially adjacent the axial surface portion 138 of the substantially circumferential, radial recess 132 of the knuckle 102, and, portions $30_{P2}$, $30_{P2}$ of the second axial end surface 30 of the first portions 18 may be arranged substantially adjacent the axial surface portion 128 of the substantially circumferential, radial recess 124 of the wheel bearing 106. When the knuckle 102, wheel bearing 106, and wheel bearing retainer 10 are arranged as described above in FIG. 5C, it will be appreciated that axial movement of the wheel bearing 108 relative the axis, A-A, in one or more directions according to the arrow, X, and, the arrow, X' (which is substantially opposite the direction of the arrow, X), is reduced or substantially eliminated. As such, cooperative engagement of the axial end surface 144 of the outer race 110 with the circumferential, axial surface 140 of the radially-inward projecting portion 142 substantially prevents or reduces axial movement of the wheel bearing 106 according to the direction of the arrow, X, whereas engagement of the portions $30_{P1}$, $30_{P2}$ of the second axial end surface 30 of the first portions 18 with the axial surface portion 128 of the substantially circumferential, radial recess 124 and engagement of the first axial end surfaces 28, 36 of the first and second portions 18, 20 of the wheel bearing retainer 10 with the first axial surface portion 134 of the substantially circumferential, radial recess 132 of the knuckle 102 prevents or reduces axial movement of the wheel bearing 106 according to the direction of the arrow, X'. Thus, it will be appreciated that the wheel bearing retainer 10 provides a simple, one-way connection of the knuckle 102 and wheel bearing 106 without additional fasteners or the like that would otherwise increase weight, cost and assembling time of a knuckle-hub assembly.

The knuckle-hub unit may be serviced as a single item. Therefore, no additional tools may be required to remove, places or services these parts.

During assembly, pre-loads may be applied to knuckle 102 and bearing 114. For example, when pressed together (see FIG. 5C) a pre-load may be applied to compress knuckle 102 and bearing 114 so that inner radial surface 32 snaps into place in radial recess 126 and then retainer 10 maintains at least some tension between knuckle 102 and bearing 114 after assembly is complete. Such pre-loading may be desirable to reduce axial movement of knuckle 102 and bearing 114 relative to each other in normal operation, as well as reducing such axial movement over temperature changes or differentials. Indeed, pre-loading may provide for substantially reduced axial gaps and/or axial movement when the materials of knuckle 102 and bearing 114 are different, and when the temperatures are different or changing.

Further, it will be appreciated that the wheel bearing retainer 10 may provide a weight benefit, if, for example, a cast iron knuckle 102 is utilized in combination with a "GEN1" wheel bearing 106. It will also be appreciated that the wheel bearing retainer 10 may provide a cost and weight benefit, if, for example, a forged steel knuckle 102 is utilized in combination with a "GEN1" wheel bearing 106. Further, it will be appreciated that the wheel bearing retainer 10 may provide a cost and weight benefit, if, for example, a cast or forged aluminum knuckle 102 is utilized in combination with a "GEN3" wheel bearing 106.

Figure 6A:
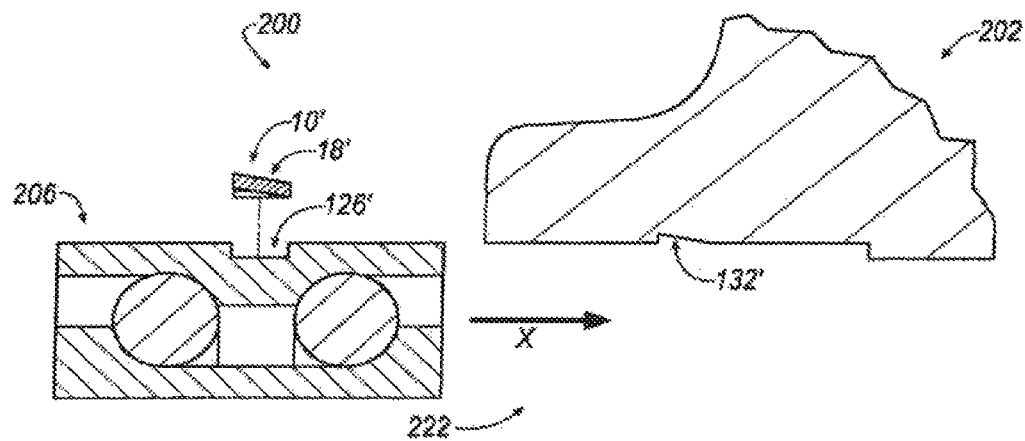
FIG. 6A illustrates a portion of an enlarged, exploded cross-sectional knuckle hub assembly.
Figure 6B:
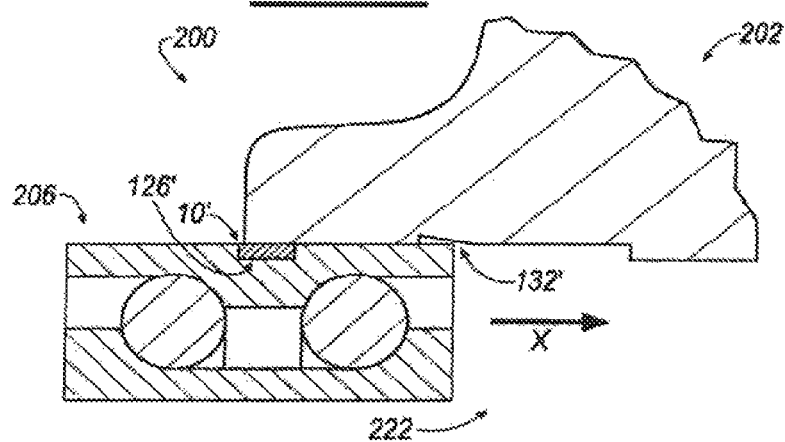
FIG. 6B illustrates a portion of an enlarged, partially-assembled cross-sectional view of the knuckle hub assembly according to FIG. 6A.
Figure 6C:
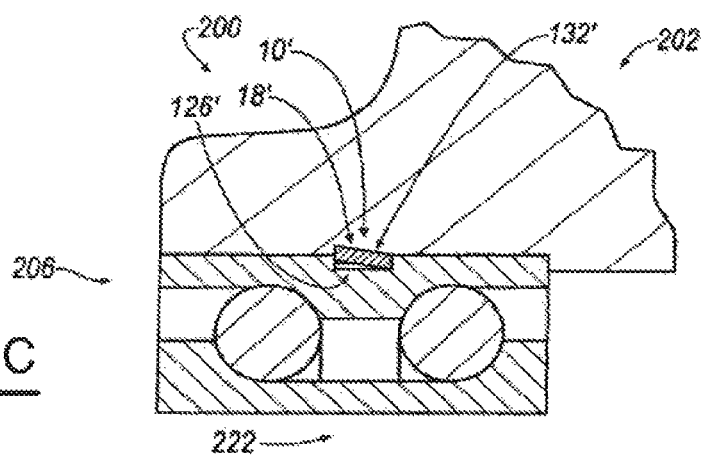
FIG. 6C illustrates another enlarged cross-sectional view of the knuckle-hub assembly according to FIGS. 6A-6B.

Referring to FIGS. 6A-6C a partial view of a knuckle-hub assembly 200 is shown in accordance with an alternative example of the invention. The knuckle-hub assembly 200 includes at least a knuckle 202, a wheel bearing 206 and a wheel bearing retainer 10'. Although other components, such as a hub, are not illustrated in FIGS. 6A-6C, it will be appreciated that the knuckle-hub assembly 200 may include additional components and that the partial view of FIGS. 6A-6C is provided for illustrative purposes without limiting the scope of the claimed invention.

The retainer preferably is configured so that in an early stage of assembly, the first flange portions protrude out of a primary recess (i.e., one of the first and second radial recesses); during a later stage of assembly, the first flange portions are in a compressed configuration so that they are arranged substantially within the primary recess; and after assembling the knuckle-hub assembly, the retainer extends into both the first and second radial recesses and axial movement of the wheel bearing relative to the knuckle in one or more axial directions is substantially eliminated, such as illustrated in FIGS. 5A, 5B, and 5C, and in FIGS. 6A, 6B, and 6C.

The knuckle-hub assembly 200 is substantially similar to the knuckle-hub assembly 100. The knuckle-hub assembly 200, however, includes substantially circumferential, radial recess 126', 132' and a wheel bearing retainer 10' that include a substantially-inverted geometry when compared to the substantially circumferential, radial recess 126, 132 and wheel bearing retainer 10 of FIGS. 5A-5C. A symmetrically-inverted geometry of the substantially circumferential, radial recess 132 of the knuckle 102 is provided as the radial recess 126' of the bearing 206, and, the symmetrically-inverted geometry of the substantially circumferential, radial recess 126 of the wheel bearing 106 is provided as the radial recess 132 of the knuckle 202.

Accordingly, as seen in alternative example of FIG. 6A, the wheel bearing retainer 10' may first be placed within the substantially circumferential, radial recess 126' of the wheel bearing 206. Then, in FIG. 6B, the wheel bearing 206 including the wheel bearing retainer 10' is moved according to the direction of the arrow, X, through the passage 222 of the knuckle 202. The passage 222 may be any passage disclosed herein. Then, in FIG. 6C, the wheel bearing retainer 10' is moved from the substantially non-relaxed state (see, e.g., FIG. 6B) to the substantially relaxed state (see, e.g., FIG. 6C) such that the first portion 18' of the wheel bearing retainer 10 is at least partially disposed within both of the substantially circumferential, radial recess 126', 132'. Thus, it will be appreciated that the wheel bearing retainer 10' performs the substantially similar function of the wheel bearing retainer 10.

Figure 7:
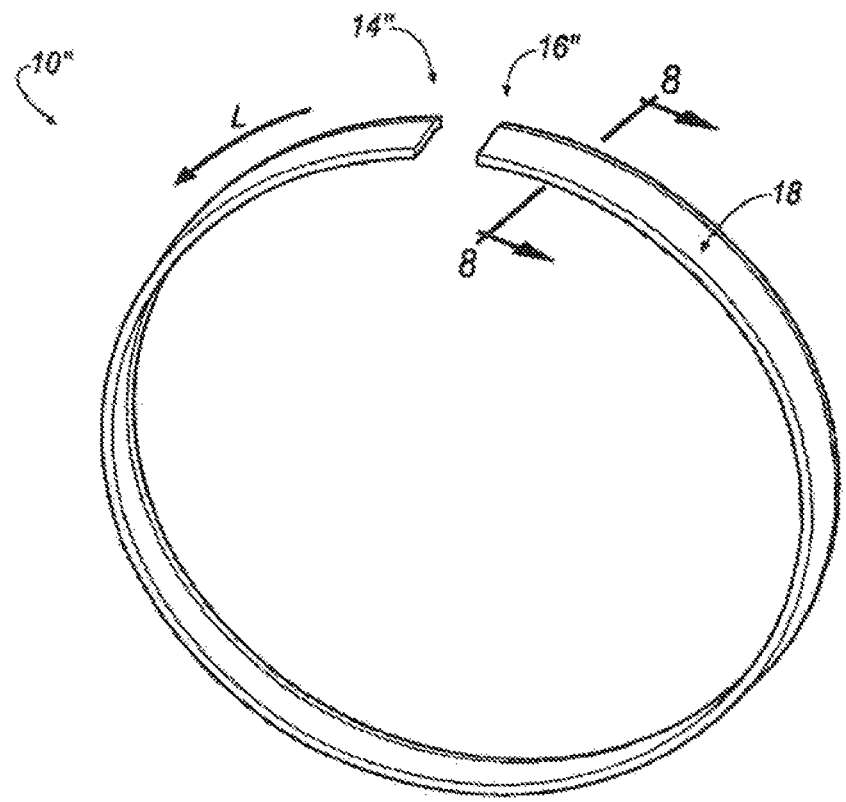
FIG. 7 illustrates an isometric view of a wheel bearing retainer.

Referring to FIG. 7, a wheel bearing retainer is shown generally at 10'' that includes a length, L, bound by a first end 14'' and a second end 16''. The wheel bearing retainer 10'' is substantially similar to the wheel bearing retainer 10 with the exception that the wheel bearing retainer 10'' includes one first portion 18 for substantially the entire length, L.

Figure 8:
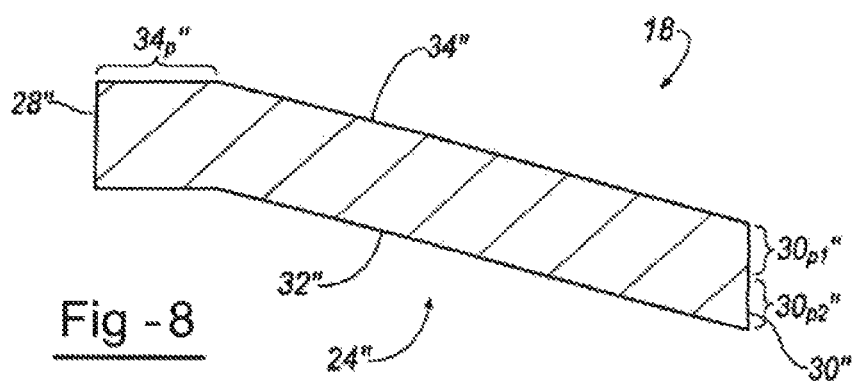
FIG. 8 illustrates a cross-sectional view of the wheel bearing retainer of FIG. 7 according to line 8-8.

Referring to FIG. 8, the wheel bearing retainer includes a flange portion 24'', a first axial end surface 28'', a second axial end surface 30'', an inner radial surface 32'' and an outer radial surface 34''. The outer radial surface 34'' includes a portion $34_P''$. The second axial end surface 30'' also includes a first portion $30_{P1}''$ and a second portion $30_{P2}''$. The portions $30_{P1}''$, $30_{P2}''$ and $34_P''$ function substantially similar as the portions $30_{P1}$, $30_{P2}$ and $34_P$ described above with respect to FIGS. 5A-5C such that the wheel bearing retainer 10'' may function substantially similarly with respect to the wheel bearing retainer 10.

Figure 10:
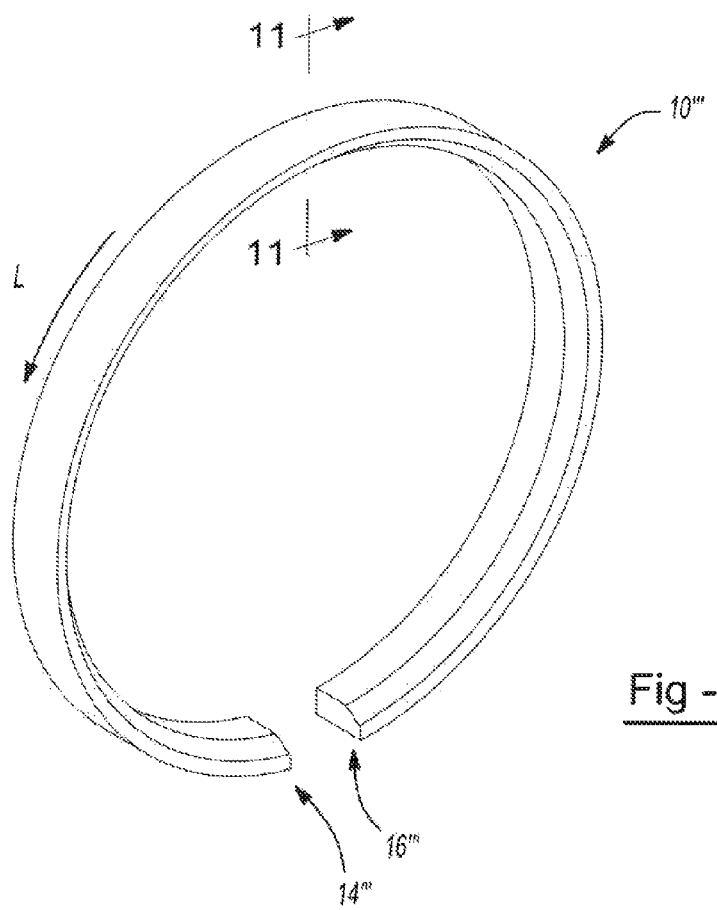
FIG. 10 illustrates an isometric view of a wheel bearing retainer.

Referring to FIG. 10, a wheel bearing retainer is shown generally at 10''' that includes a length, L, bound by a first end 14''' and a second end 16'''. The wheel bearing retainer illustrated in FIG. 10 may include a cross sectional region according to line 11-11 and illustrated in FIG. 11. The first end 14''' and the second end 16''' may be separated by a distance. The distance between the first end and the second end may be any distance that allows the wheel bearing retainer to be placed in the radial recess. The distance between the first end and the second end may be large enough so that the wheel bearing retainer may be compressed such that the wheel bearing retainer may be flush with a radial wall of the wheel bearing (i.e., the wheel bearing retainer does not extend out of the radial recess) so that the wheel bearing and the wheel bearing retainer may be placed (i.e., pressed) into the knuckle. The distance between the first end and the second end may be large enough so that the retainer may be expanded to fit around the largest outside circumference of the wheel bearing so that the wheel bearing may be pushed in the passage of the knuckle. The distance between the first end 14''' and the second end 16''' may be about 5.0 mm or more preferably about 10 mm or more, or more preferably about 13 mm or more. The distance between the first end 14''' and the second end 16''' may be about 30 mm or less, preferably about 20 mm or less, or more preferably about 15 mm or less (i.e. about 13.5 mm). The retainer may have a relaxed state (i.e., when the first end and second end are separated by a distance). The retainer may have a non-relaxed state (i.e., a force other than the knuckle and/or wheel bearing is forcing the first end and the second end into closer proximity).

Figure 11:
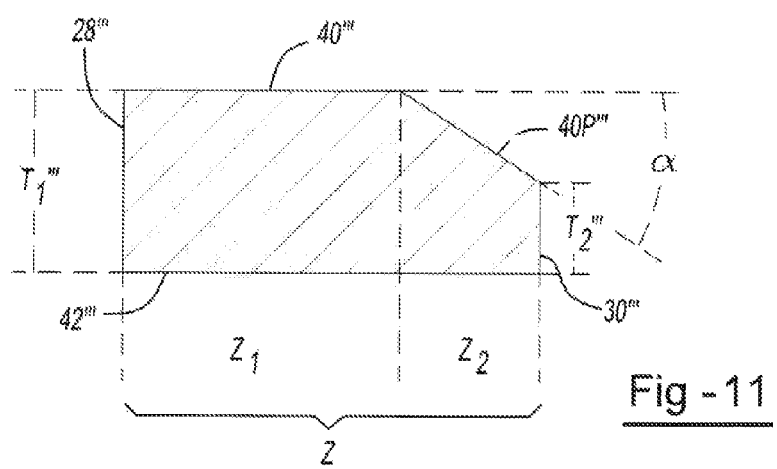
FIG. 11 illustrates a cross-sectional view of the wheel bearing retainer of FIG. 10 according to line 11-11.

Referring to FIG. 11, the wheel bearing retainer includes a first axial end surface 28''' a second axial end surface 30''', an outer radial surface 40''', and an inner radial surface 42'''. The outer radial surface, the inner radial surface, or both of the wheel bearing retainer may be substantially flat. The outer radial surface, the inner radial surface, or both of the wheel bearing retainer may be contoured. The outer radial surface, the inner radial surface, or both of the wheel bearing retainer may include one or more contact surfaces so that the outer radial surface, the inner radial surface, or both contact all or a portion of the radial recess and maintain the wheel bearing inside of the knuckle.

The cross section shown in FIG. 11 illustrates a generally trapezoidal structure with a thickness and a length. The trapezoidal structure may include a cross-sectional length, Z. The cross-sectional profile may be constant throughout the ring. The trapezoidal structure may include one or more thicknesses $T_1'''$ and $T_2'''$. The inner radial surface 42''' may include a tapered portion. Preferably, the outer radial surface 40''' may include a tapered portion 40p'''. The cross-sectional length, $Z_2$, of the tapered portion, 40p''', may be the entire cross-sectional length, Z, or may be shorter than the cross-sectional length Z, thus, creating a non-tapered cross-sectional length $Z_1$. The cross-sectional length, $Z_2$, of the tapered portion may be any length that allows an angle to be formed. The cross-sectional length, $Z_2$, of the tapered portion may be any length that allows a steep angle to be formed so that the wheel bearing retainer fits into the radial recess, and the wheel bearing retainer to be maintained in the radial recess. The cross-sectional length, $Z_2$, of the tapered portion may be any length that allows a gradual angle to be formed so that the wheel bearing retainer fits into the radial recess, and the wheel bearing retainer to be maintained in the radial recess. The cross sectional length Z may be equal to $Z_1+Z_2$ (e.g., $Z=Z_1+Z_2$), The cross-sectional length of $Z_1$ may be equal to $Z_2$. The cross sectional length of $Z_1$ may be greater than $Z_2$. The cross-sectional length of $Z_1$ may be less than $Z_2$.

The cross-sectional length may be any length that allows the wheel bearing retainer to fit into the radial recess and hold the wheel bearing in the knuckle assembly so that the wheel bearing does not move within the knuckle. The cross-sectional length of a first portion, Z, of the wheel bearing retainer may be about 3 mm or more, preferably about 5 mm or more, or more preferably about 7 mm or more. The cross-sectional length, Z, of the wheel bearing retainer may be about 20 mm or less, preferably about 15 mm or less, or more preferably about 10 mm or less (i.e., about 8 mm). The cross-sectional length of the tapered portion may be any length that assists in placing the wheel bearing retainer into the radial recess. The cross-sectional length of a second portion or a tapered portion, $Z_2$, may be about 1.0 mm or more, preferably about 2.0 mm or more, or more preferably about 2.5 mm or more. The cross-sectional length of the tapered portion, $Z_2$, may be about 10 mm or less, preferably about 5.0 mm or less, or more preferably about 3.0 mm or less (i.e., about 2.7 mm).

The tapered portion 40p''' may form an angle (i.e. second portion). The angle may be any angle that allows the retainer to fit into the radial recess 126, 126', or 326. The angle may be any angle that allows the retainer to be pressed into the radial recess 126, 126', or 326 so that once pressed into the radial recess the wheel bearing retainer may not be easily removed. The tapered portion may form an angle, α. The angle, α, may be any angle that assists in placing the wheel bearing retainer into the radial recess. The angle, α, may be about 15° or greater, preferably about 20° or greater, or more preferably about 25° or greater relative to the first portion (i.e. the flat portion). The angle, α, may be about 60° or less, about 50° or less, preferably about 45° or less, more preferably about 35° or less (i.e., about 30°) relative to the first portion. The angle, α, may be between about 5° and about 75°, preferably between about 10° and about 60°, or more preferably between about 15° and about 45° relative to the first portion.

The wheel bearing retainer may have a thickness, $T_1'''$ and $T_2'''$. The thickness, $T_1'''$ and $T_2'''$, may be any sufficient thickness that holds the wheel bearing in the knuckle without breaking and/or deforming the wheel bearing retainer. The thicknesses, $T_1'''$ and $T_2'''$, may be the same thickness. Preferably, thicknesses, and $T_1'''$ and $T_2'''$, may be different thicknesses. More preferably, $T_2'''$ may be less than $T_1'''$. The thickness, $T_1'''$, may be about 1.0 mm or more, preferably about 2.0 mm or more, or more preferably about 3.0 mm or more. The thickness, $T_1'''$, may be about 7.0 mm or less, preferably about 5.0 mm or less, or more preferably about 4.0 mm or less (i.e., about 3.25 mm). The thickness, may be about 0.5 mm or more, preferably about 1.0 mm or more, or more preferably about 1.5 mm or more. The thickness, $T_2'''$, may be about 5.0 mm or less, preferably about 3.0 mm or less, or more preferably about 2.0 mm or less (i.e., about 1.75 mm).

The wheel bearing retainer may have length to thickness ratio (e.g. cross-sectional length, Z, to thickness, $T_1'''$). The length to thickness ratio may be about 10:1 or less, preferably about 5:1 or less, or more preferably about 3:1 or less. The length to thickness ratio may be about 1:1 or more preferably about 1.5:1 or more or more preferably about 2:1, or more (i.e. about 2.5:1). The ratio of length to thickness may be between about 1:1 to about 10:1, preferably about 1.5:1 to about 5:1, or more preferably about 2:1 to about 3:1. The length Z may be greater than thickness $T_1'''$. The thickness $T_1'''$, may be about 0.8Z or less, preferably about 0.6Z or less, or more preferably about 0.5Z or less (e.g., about 0.41Z).

The wheel bearing retainer may be used with any of the knuckle embodiments discussed and described herein. The wheel bearing retainer may be used with a first radial recess, a second radial recess, or both that include a tapered portion. The wheel bearing retainer may be used with a first radial recess, a second radial recess or both that do not include a tapered portion (i.e., the inner surfaces of the first radial recess and the second radial recess are substantially parallel over their entire length). The first radial recess and the second radial recess may be different lengths. Preferably, the first radial recess and the second radial recess may be substantially the same length. The first radial recess and the second radial recess may have a width (i.e., the width of the radial recesses corresponds to the cross-sectional length of the wheel bearing retainer) of about 3.0 mm or more preferably about 5 mm or more, or more preferably about 7 mm or more. The first radial recess and the second radial recess may have a width of about 20 mm or less, preferably about 15 mm or less, or more preferably about 10 mm or less (i.e. about 8.2 mm). The width of the radial recess may be substantially the same as the cross-sectional length of the wheel bearing retainer (i.e., about 0.2 mm larger than the cross-sectional length of the wheel bearing retainer).

The radial recess may be located at any location along the outer radial surface of the wheel bearing so that the wheel bearing retainer fits into the first radial recess, second radial recess, or both and maintains the wheel bearing inside the knuckle. Preferably, the radial recess may be located substantially in the center of the wheel bearing. More preferably, the radial recess may not be located on an end of the wheel bearing. The first radial recess, the second radial recess, or both may include a depth (i.e., an area of material that has been removed from the knuckle, the wheel bearing, or both). The depth of the radial recess may be any depth that the wheel bearing retainer may fit into the first radial recess, the second radial recess, or both and the wheel bearing may be placed in the knuckle. The depth of the first radial recess, the second radial recess or both may be substantially similar. The depth of the first radial recess, the second radial recess or both may be substantially equal to the thickness of the wheel bearing retainer. Preferably, the depth of the first radial recess, the second radial recess, or both may be slightly more than the thickness of the wheel bearing retainer so that the wheel bearing retainer may fit in the recess and not interfere with the wheel bearing being placed in the knuckle.

Figure 9:
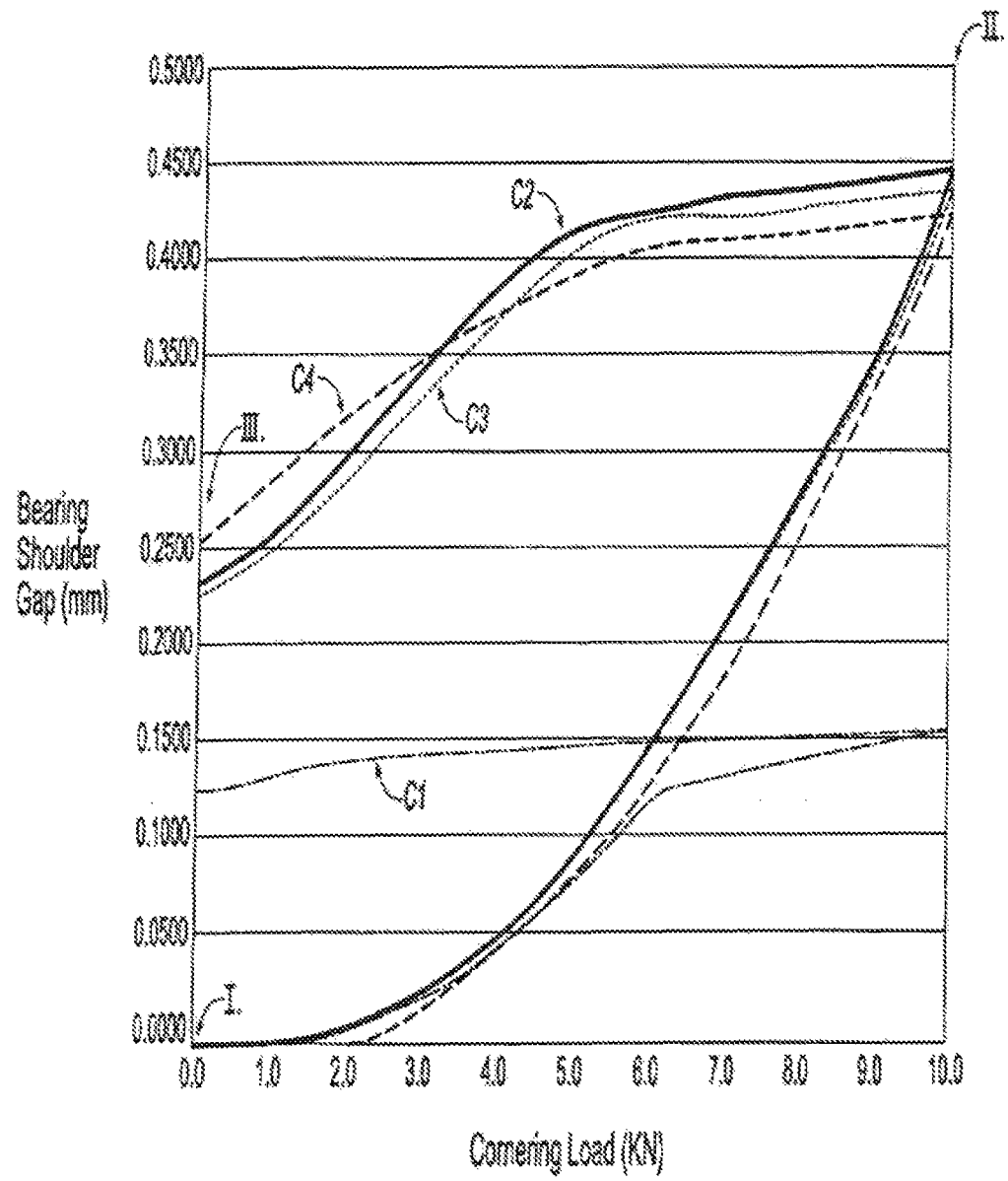
FIG. 9 illustrates a graph comparing performance of conventional knuckle-hub assemblies to a knuckle-hub assembly of the present invention.

Referring to FIG. 9, a graph is shown that illustrates "loading cycles" and "unloading cycles" of a plurality of knuckle-hub assemblies. The X-axis designates a "cornering load" measured in kilo-Newtons (kN). The Y-axis designates a "bearing shoulder gap" measured in milli-meters (mm). The bearing shoulder gap generally references the axial movement of a wheel bearing relative a knuckle of a knuckle-hub assembly when a vehicle is entering a turn (e.g., the "loading cycle"), and, when the vehicle is exiting a turn (e.g., the "unloading cycle"). The "loading cycle" generally occurs between the graph designation "I". and the graph designation "II". The "unloading cycle" generally occurs between the graph designation "II" and the graph designation "III". As such, each curve, C1-C4, generally beings at about graph designation I, moves to about graph designation II, then ends at about graph designation III.

A first curve C1 is related to performance of the knuckle-hub assembly 100, 200 of the claimed invention. The graph also includes several additional curves, C2-C4, that are related to performance of conventional knuckle-hub assembles that do not include the novel wheel bearing retainer 10, 10', 10". The curve C2 relates to a conventional aluminum knuckle and a wheel bearing that is nominally press-fit to the knuckle. The curve C3 relates to an aluminum knuckle having an infinite yield strength and a wheel bearing that is nominally press-fit to the knuckle. The curve C4 relates to a conventional iron knuckle and a wheel bearing that is nominally press-fit to the knuckle.

When comparing the curve, C1, to the curves, C2-C4, it will be appreciated that the wheel bearing retainer 10, 10', 10 ''' associated with the curve, C1 significantly reduces the axial shifting of the wheel bearing 106, 206 relative the knuckle 102, 202 by about 67%. As illustrated by the curves, C2-C4, the wheel bearing is permitted to shift axially relative the knuckle by about 0.425 mm to about 0.450 mm whereas the wheel bearing retainer 10, 10', 10" limits axial shifting of the wheel bearing 106, 206 relative the knuckle to be about 0.150 mm. As such, it will be appreciated that in addition to cost, weight and assembling benefits, the wheel bearing retainer 10, 10', 10" a so realizes performance improvements over conventional knuckle-hub assemblies.

Figure 12A:
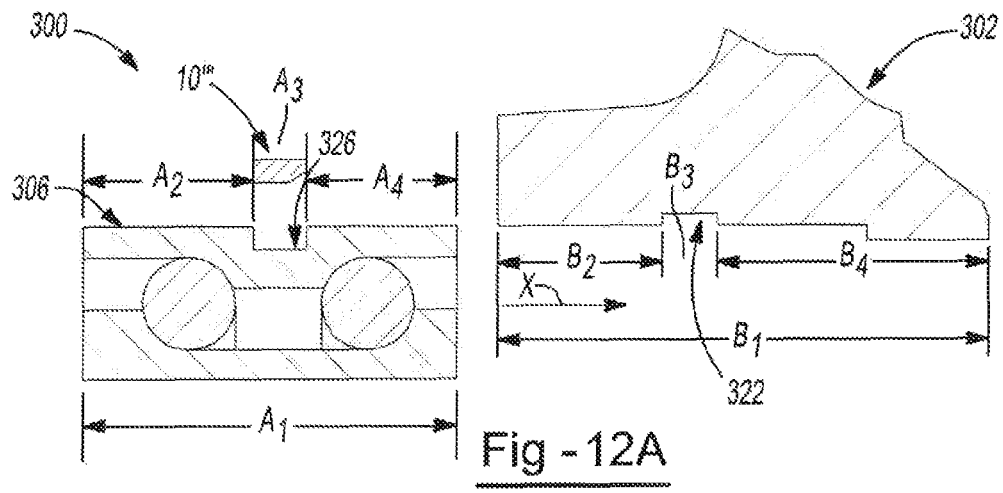
FIG. 12A illustrates a portion of an enlarged, exploded cross=sectional view of a knuckle hub assembly.
Figure 12B:
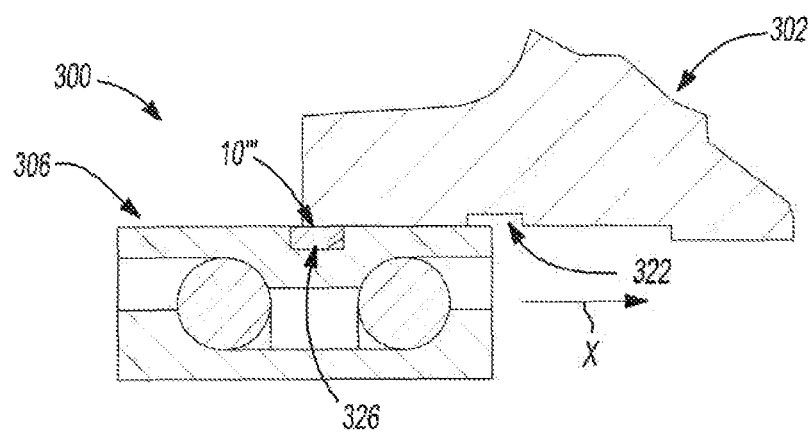
FIG. 12B illustrates a portion of an enlarged, partially-assembled cross-sectional view of the knuckle hub assembly according to FIG. 12A.
Figure 12C:
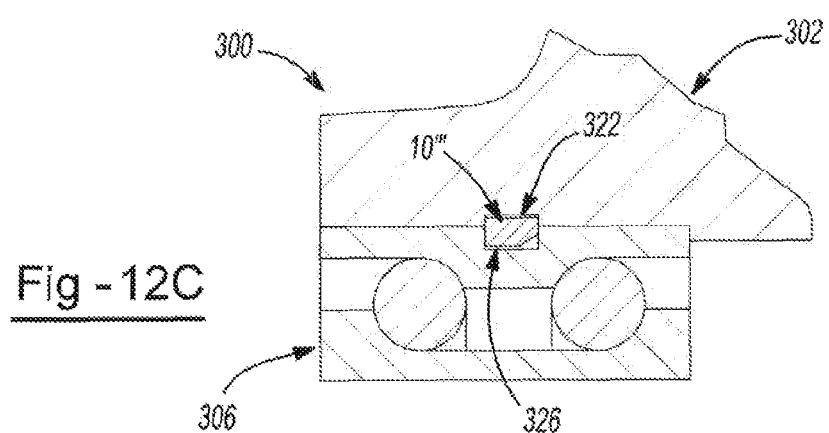
FIG. 12C illustrates another enlarged cross-sectional view of the knuckle-hub assembly according to FIGS. 12A-12B.

Referring to FIGS. 12A-12C a partial view of a knuckle-hub assembly 300 is shown in accordance with an alternative example of the invention. The knuckle-hub assembly 300 includes at least a knuckle 302, a wheel bearing 306, and a wheel bearing retainer 10'''. Although other components, such as a hub, are not illustrated in FIGS. 12A-12C, it will be appreciated that the knuckle-hub assembly 300 may include additional components and that the partial views of FIGS. 12A-12C are provided for illustrative purposes without limiting the scope of the claimed invention.

The knuckle-hub assembly 300 is substantially similar to the knuckle-hub assemblies 100 and 200. The knuckle-hub assembly 300, however, may include a radial recess 326 and 332 that may have a substantially similar shape and size. The radial recesses 326 and 332 may house all or a portion of the wheel bearing retainer 10'''.

Accordingly, as may be seen in the alternative example of FIG. 12 A, the wheel bearing retainer 10''' may first be placed within the second radial recess 326 of the wheel bearing 306. Then, in FIG. 12B, the wheel bearing 306 including the wheel bearing retainer 10''' may be moved according to the direction of the arrow, X, through the passage 322 of the knuckle 302. The wheel bearing retainer 10''' may be compressed, so that the first end portion 14''' is moved into contact or into substantially close proximity to the second end 16'''. Upon compressing the wheel bearing retainer 10''', the wheel bearing retainer may be substantially flush with the radial surface of the wheel bearing 306. Upon compression the wheel bearing retainers 10''' circumference may be reduced so that the wheel bearing retainer fits completely inside of the radial recess 326 such that no portion of the wheel bearing retainer extends out of the radial recess. Then, in FIG. 12C, the wheel bearing retainer 10''' may be moved from the substantially non-relaxed state (see, e.g., FIG. 12B) to the substantially relaxed state (see, e.g., FIG. 12C). The wheel bearing retainer 10''' may elastically deform such that the first end 14''' of the wheel bearing retainer moves away from the second portion 16''' of the wheel bearing retainer so that the wheel bearing retainer 10''' is at least partially disposed within both the substantially circumferential radial recesses 236 and 332.

It is further contemplated that the any of the wheel bearing retainers may be installed by any of the methods discussed herein. For example, the wheel bearing retainer illustrated in FIGS. 10 and 11 may be installed into the knuckle using the method disclosed herein with regard to FIGS. 5A-5C (i.e., the retainer may be placed in the knuckle first). In one example, any of the wheel bearing retainers may be first placed into the radial recess of the wheel bearing and compressed so that the retainer is flush with the outer radial surface of the wheel bearing and then the wheel bearing and the retainer are placed into the knuckle. In another example, any of the wheel bearing retainers discussed herein may first be placed into the radial recess of the knuckle and (i) the retainer may be expanded so that the wheel bearing may be placed in the passage of the knuckle, (ii) the wheel bearing may expand the retainer as the wheel bearing is moved through the passage of the knuckle, or (iii) a combination of (i) and (ii).

The radial recess may be located at any location along the wheel bearing, the knuckle, or both so that the wheel bearing retainer may maintain or assist in maintaining the wheel bearing inside of the knuckle. Preferably, the radial recess may be located substantially in the center of the wheel bearing, the knuckle, or both. The radial recess may have a length and depth. Preferably, the depth of the radial recess may be deep enough so that the wheel bearing retainer may be placed in the radial recess and the wheel bearing retainer does not extend out of the radial recess. The length and/or width of the radial recess may be any length and/or width so that the wheel bearing retainer fits inside of the radial recess. Preferably, the length and/or width of the radial recess may be any length and/or width that does not structurally weaken the outer radial surface of the wheel bearing. The integral radial recess may be located in an intermediate region of the wheel bearing, the knuckle, or both. The intermediate region may be located substantially in the center of the wheel bearing, the knuckle, or both. The intermediate region may be biased to one side of the wheel bearing, the knuckle, or both (e.g. about 20 percent off center or less, about 10 percent off center or less, about 5 percent off center or less). Preferably, the intermediate region and/or intermediate portion may always be biased by at least 20 percent or more of the total length from the ends of the knuckle, the wheel bearing, or both.

The length of the wheel bearing may be $A_1$. The circumferential radial recess may be located at any location along the length $A_1$ of the wheel bearing. The radial recess may be located a length $A_2$ from the front edge of the wheel bearing. The radial recess may be located a length $A_4$ from the back edge of the wheel bearing. Lengths $A_2$ and $A_4$ may be the same. Lengths $A_2$ and $A_4$ may be different. Length $A_2$ may be between about 0.2 to about 0.6 of $A_1$, preferably length $A_2$ may be between about 0.3 to about 0.55 of $A_1$, or more preferably between about 0.4 to about 0.5 of $A_1$. The radial recess may be located about 20 to about 60 percent, preferably about 30 to about 55, or more preferably about 40 to about 50 percent of the total distance from the front wall. Length $A_4$ may be between about 0.2 to about 0.6 of $A_1$, preferably length $A_4$ may be between about 0.3 to about 0.55 of $A_1$, or more preferably between about 0.4 to about 0.5 of $A_1$. The radial recess may be located about 20 to about 60 percent, preferably about 30 to about 55, or more preferably about 40 to about 50 percent of the total distance from the back wall. The radial recess may have a length $A_3$. The length $A_3$ of the radial recess may be about 0.1 to about 0.4 of $A_1$ (i.e. the radial recess may be about 10 to about 40 percent of the total length of the wheel bearing). The total length of the wheel bearing may be the distance from the front wall plus the length of the radial recess plus the distance from the back wall (i.e. $A_1=A_2+A_3+A_4$). The first radial recess and the second radial recess may substantially align so that the wheel bearing retainer may be substantially contained in both the first radial recess and the second radial recess in the relaxed state. The second radial recess may be located at any location along the inner radial surface of the knuckle so that first radial recess and the second radial recess substantially align. Preferably, the first radial recess and the second radial recess may be substantially the same width and/or length.

The length of the knuckle may be $B_1$. The circumferential radial recess may be located at any location along the length $B_1$ of the knuckle. The radial recess may be located a length $B_2$ from the front edge of the knuckle. The radial recess may be located a length $B_4$ from the back edge of the knuckle. Lengths $B_2$ and $B_4$ may be the same. Lengths $B_2$ and $B_4$ may be different. Length $B_2$ may be between about 0.2 to about 0.6 of $B_1$, preferably about 0.3 to about 0.55 of $B_1$, or more preferably about 0.4 to about 0.5 of $B_1$. The radial recess may be located about 20 to about 60 percent, preferably about 30 to 55 percent, or more preferably about 40 to about 50 percent of the total distance from the front wall. Length $B_4$ may be between about 0.2 to about 0.6 of $B_1$, preferably about 0.3 to about 0.55 of $B_1$, or more preferably about 0.4 to about 0.5 of $B_1$. The radial recess may be located about 20 to about 60 percent, preferably about 30 to about 55 percent, or more preferably about 40 to about 50 percent of the total distance from the back wall. The radial recess may have a length $B_3$. The length $B_3$ of the radial recess may be about 0.1 to about 0.4 of $B_1$ (i.e. the radial recess may be about 10 to out 40 percent of the total length of the knuckle). The total length of the knuckle may be the distance from the front wall plus the length of the radial recess plus the distance from the back wall (i.e. $B_1=B_2+B_3+B_4$).

One embodiment of the present invention, may include: A knuckle-hub assembly (100, 200), comprising: a knuckle (102, 202), wherein the knuckle (102, 202) includes an inner radial surface (120) defining a passage (122, 222), wherein the inner radial surface (120) comprises a first radial recess (132, 132'); a wheel bearing (106, 206), wherein the wheel bearing includes an outer radial surface (124) defining a second radial recess (126, 126'), wherein the first radial recess (132, 132') of the knuckle (102, 202) is axially-aligned with the second radial recess (126, 126'); and a retainer (10, 10', 10") arranged within both of the first radial recess (132, 132') of the knuckle (102, 202) and the second radial recess (126, 126') of the wheel bearing (106, 206), The embodiment of the present invention may be used in conjunction with one or more of the other embodiments disclosed herein.

In another embodiment the present invention may include separately or in combination with other embodiments discussed herein the retainer (10, 10', 10") includes a ring-shaped member (12) arranged within both of the first radial recess (132, 132') of the knuckle (102, 202) and the second radial recess (126, 126') of the wheel bearing (106, 206); the retainer (10, 10') includes a first portion (18) having a first flange (24), a second portion (20) having a second flange (26), and a union portion (22) that joins the first portion (18) to the second portion (20), wherein the first flange (24) projects from the union portion (22) at an angle ($\theta$) relative the second flange portion (26); the first flange (24) to project radially inwardly relative an axis (A-A) extending through the ring-shaped member (12); the angle ($\theta$) defines the first flange (24) to project radially outwardly relative an axis (A-A) extending through the ring-shaped member (12); the retainer (10") includes a first portion (18) having a first flange (24"), and a union portion (22) connected to the first portion (18), wherein the first flange (24') projects from the union portion (22) at an angle ($\theta$); the angle ($\theta$) defines the first flange (24") to project radially inwardly relative an axis (A-A) extending through the ring-shaped member (12); the angle ($\theta$) defines the first flange (24") to project radially outwardly relative an axis (A-A) extending through the ring-shaped member (12); or a combination thereof.

In another embodiment the present invention may include separately or in combination with other embodiments discussed herein a wheel bearing (106, 206) includes an inner race (108), an outer race (110), and, balls (112) arranged between and contacting both of the inner race (108) and the outer race (110), wherein the outer race (110) includes the outer radial surface (124) of, the wheel bearing (106, 206); the first radial recess (132) of the knuckle (102) includes a first axial surface portion (134) projecting substantially perpendicularly from the inner radial surface (120), a radial surface portion (136) projecting substantially perpendicularly from the first axial surface portion (134), and a second axial surface portion (138) projecting substantially perpendicularly from the radial surface portion (136) toward the inner radial surface (120); a second radial recess (126) of the wheel bearing (106) includes an axial surface portion (128), and a radial surface portion (130), wherein the axial surface portion (128) is arranged substantially perpendicularly with respect to the, outer radial surface (124), wherein the radial surface portion (130) projects from the outer radial surface (124) at a substantially non-perpendicular angle (ω); a first radial recess (132') of the knuckle (202) includes an axial surface portion (128), and a radial surface portion (130), wherein the axial surface portion (128) is arranged substantially perpendicularly with respect to the outer radial surface (124), wherein the radial surface portion (130) projects from the outer radial surface (124) at a substantially non-perpendicular angle (ω); a second radial recess (126) of the wheel, bearing (206) includes a first axial surface portion (134) projecting substantially perpendicularly from the inner radial surface (120), a radial surface portion (136) projecting substantially perpendicularly from the first axial surface portion (134), and a second axial surface portion (138) projecting substantially perpendicularly from the radial surface portion (136) toward the inner radial surface (120); a retainer (10, 10', 10") provides a means for limiting axial movement of the wheel bearing (106, 206) relative the knuckle (102, 202); or a combination thereof.

In another embodiment the present invention may include separately or in combination with other embodiments discussed herein: a wheel bearing retainer (10, 10'), comprising: a ring-shaped member (12) including a first portion (18) having a first flange (24), a second portion (20) having a second flange (26), and a union portion (22) that joins the first portion (18) to the second portion (20), wherein the first flange (24) projects from the union portion (22) at an angle (θ) relative the second flange portion (26); an angle (θ) defines the first flange (24) to project radially inwardly relative an axis (A-A) extending through the ring-shaped member (12); a retainer (10, 10') provides means for limiting axial movement of a wheel bearing (106, 206) relative a knuckle (102, 202) of a knuckle-hub assembly (100, 200); or a combination thereof.

In another embodiment the present invention may include separately or in combination with other embodiments discussed herein: a wheel bearing retainer (10'), comprising: a ring-shaped member (12) including a first portion (18) having a first flange (24"), and a union portion (22) connected to the first portion (18), wherein the first flange (24") projects from the union portion (22) at an angle (θ); an angle (θ) defines the first flange (24") to project radially inwardly relative an axis (A-A) extending through the ring-shaped member (12); a retainer (10") provides means for limiting axial movement of a wheel bearing (106, 206) relative a knuckle (102, 202) of a knuckle hub assembly (100, 200) or a combination thereof.

In another embodiment the present invention may include separately or in combination with other embodiments discussed herein: the retainer elastically deforms after the wheel bearing is placed in the knuckle so that the retainer relaxes to be located inside of the first radial recess and the second radial recess; the length of the second radial recess is between about 10 percent to about 40 percent of the total length of the wheel bearing; the intermediate region is off center of the wheel bearing, the knuckle, or both by at least about 10 percent of the total length of the wheel bearing, the knuckle, or both respectively; the thickness of the retainer is about 0.5 times the length of the retainer or less, or a combination thereof.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary technical meanings unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A knuckle-hub assembly, comprising:
    a knuckle, wherein the knuckle includes an inner radial surface defining a passage, wherein the inner radial surface comprises a first radial recess located in an intermediate region along a longitudinal axis of the passage;
    a wheel bearing, wherein the wheel bearing includes an outer radial surface defining a second radial recess that is located in an intermediate region along the length of the bearing, wherein the first radial recess of the knuckle is generally axially-aligned with the second radial recess upon installation of the bearing in the passage of the knuckle; and
    a retainer arranged within both of the first radial recess of the knuckle and the second radial recess of the wheel bearing upon installation of the bearing in the passage of the knuckle, wherein the retainer has a generally split ring-shape and has a length along a circumferential direction including a first circumferential end and a second circumferential end separated by a gap, the retainer having an axial width between a first axial end surface and an opposing second axial end surface, wherein the first axial end surface is generally continuous and the second axial end surface is discontinuous, the retainer includes a union portion adjacent to the first axial end and extending the length of the retainer, a plurality of first flange portions each having a first axial end connected to the union portion, a second axial end having a surface, and spaced apart in the circumferential direction, and a plurality of second flange portions each having a first axial end connected to the union portion, a second axial end having a surface, and spaced apart in the circumferential direction, wherein the second axial end surface of the retainer includes the surfaces of the second axial ends of the first and second flange portions, and wherein the second axial end surfaces of the first flange portions are offset from the second axial end surfaces of the second flange portions in a radial direction when the retainer is in a relaxed state;
    wherein the retainer is configured so that:
    i) in an early stage of assembly, the first flange portions protrude out of a primary recess, wherein the primary recess is one of the first and second radial recesses;
    ii) during a later stage of assembly, the first flange portions are in a compressed configuration so that they are arranged substantially within the primary recess; and
    iii) after assembling the knuckle-hub assembly, the retainer extends into both the first and second radial recesses and axial movement of the wheel bearing relative to the knuckle in one or more axial directions is substantially eliminated.

2. The knuckle-hub assembly of claim 1, wherein the wheel bearing includes
an inner race,
an outer race, and
balls arranged between and contacting both of the inner race and the outer race, wherein the outer race includes the outer radial surface of the wheel bearing.

3. The knuckle-hub assembly of claim 1, wherein the second flange portion forms an angle of about 15-35° relative to the first flange portion.

4. The knuckle-hub assembly of claim 3, wherein the retainer has a repeating, alternating pattern of the first flange portions and second flange portions for substantially the length of the retainer.

5. The knuckle-hub assembly of claim 1, wherein the wheel bearing and the retainer are in a press fit relationship with the knuckle so that the wheel bearing retainer maintains the wheel bearing in the knuckle recess during conditions that act to pull the wheel bearing out of the knuckle recess.

6. The knuckle-hub assembly of claim 1, wherein the wheel bearing has a front wall and a rear wall which are spaced apart along the longitudinal axis and separated by a total distance, wherein the second radial recess is located between about 20 percent to about 60 percent of the total distance from the front wall.

7. The knuckle hub assembly of claim 6, wherein the second radial recess is located between about 20 percent to about 60 percent of the total distance from the back wall.

8. The knuckle-hub assembly of claim 1, wherein the first and second circumferential ends of the retainer are separated by an initial gap distance when the retainer is in a relaxed state, and are separated by a second gap distance during assembly of the knuckle-hub assembly, wherein the second gap distance is reduced from the initial gap distance so that the retainer fits substantially into the first radial recess of the bearing.

9. The knuckle hub assembly of claim 1, wherein the second portion forms an angle of about 10° to 65° relative to the first flange portion.

10. The knuckle-hub assembly of claim 9, wherein
each first flange portion has an inner radial surface and each second flange portion has an inner radial surface angled relative to the inner radial surfaces of the first flange portions;
each first flange portion has an outer radial surface and each second flange portion has an outer radial surface angled relative to the outer radial surfaces of the first flange portions;
the inner radial surface and the outer radial surface of the first flange portions are generally parallel;
the inner radial surface and the outer radial surface of the second flange portions are generally parallel;
the plurality of first portions and the plurality of second portions are arranged in an alternating arrangement.

11. The knuckle-hub assembly of claim 1, wherein each of the first flange portions and each of the second flange portions have substantially the same width.

12. A knuckle-hub assembly, comprising:
a knuckle, wherein the knuckle includes an inner radial surface defining a passage, wherein the inner radial surface comprises a first radial recess located in an intermediate region along a longitudinal axis of the passage;
a wheel bearing, wherein the wheel bearing includes an outer radial surface defining a second radial recess that is located in an intermediate region along the length of the bearing, wherein the first radial recess of the knuckle is generally axially-aligned with the second radial recess upon installation of the bearing in the passage of the knuckle; and
a retainer formed from a single-thickness material and arranged within both of the first radial recess of the knuckle and the second radial recess of the wheel bearing upon installation of the bearing in the passage of the knuckle, wherein the retainer has a generally split ring-shaped and has a length along a circumferential direction including a first circumferential end and a second circumferential end separated by a gap, the retainer having an axial width between a first axial end surface and an opposing second axial end surface, the retainer includes a union portion adjacent to the first axial end and extending the length of the retainer, and the retainer has a generally constant cross-sectional profile about its circumference, the retainer includes an angled flange portion extending from the union portion in a generally axial direction, wherein the angled flange portion has an inner radial surface and an outer radial surface, wherein the inner radial surface of the angled flange portion is angled relative to the axial direction when the retainer is in a relaxed state;
wherein the retainer is configured so that:
i) in an early stage of assembly, the first flange portions protrude out of a primary recess, wherein the primary recess is one of the first and second radial recesses;
ii) during a later stage of assembly, the first flange portions are in a compressed configuration so that they are arranged substantially within the primary recess; and
iii) after assembling the knuckle-hub assembly, the retainer extends into both the first and second radial recesses and axial movement of the wheel bearing relative to the knuckle in one or more axial directions is substantially eliminated.

13. The knuckle-hub assembly of claim 12, wherein the wheel bearing includes
an inner race,
an outer race, and
balls arranged between and contacting both of the inner race and the outer race, wherein the outer race includes the outer radial surface of the wheel bearing.

14. The knuckle-hub assembly of claim 12, wherein the wheel bearing and the retainer are in a press fit relationship with the knuckle so that the wheel bearing retainer maintains the wheel bearing in the knuckle recess during conditions that act to pull the wheel bearing out of the knuckle recess.

15. The knuckle-hub assembly of claim 12, wherein the wheel bearing has a front wall and a rear wall which are spaced apart along the longitudinal axis and separated by a total distance, and the second radial recess is located between about 20 percent to about 60 percent of the total distance from the front wall.

16. The knuckle hub assembly of claim 12, wherein the second radial recess is located between about 20 percent to about 60 percent of the total distance from the back wall.

17. The knuckle-hub assembly of claim 12, wherein the first and second circumferential ends of the retainer are separated by an initial gap distance when the retainer is in a relaxed state, and are separated by a second gap distance during assembly of the knuckle-hub assembly, wherein the second gap distance is reduced from the initial gap distance so that the retainer fits substantially into the first radial recess of the bearing.

18. The knuckle hub assembly of claim 12, wherein the angled flange portion forms an angle of about 10° to 65° relative to the axial direction.

19. The knuckle-hub assembly of claim 18, wherein
the inner radial surface of the angled flange portion forms an angle of about 10° to 65° relative to the axial direction;
the outer radial surface of the angled flange portion forms an angle of about 10° to 65° relative to the axial direction; and
the inner radial surface and the outer radial surface of the angled flange portion are generally parallel.

20. The knuckle-hub assembly of claim 19, wherein
the wheel bearing includes an inner race, an outer race, and balls arranged between and contacting both of the inner race and the outer race, wherein the outer race includes the outer radial surface of the wheel bearing;
the wheel bearing has a front wall and a rear wall which are spaced apart along the longitudinal axis and separated by a total distance, and the second radial recess is located between about 20 percent to about 60 percent of the total distance from the front wall; and
the second radial recess is located between about 20 percent to about 60 percent of the total distance from the back wall.

* * * * *